US009633499B2

(12) United States Patent
Creguer et al.

(10) Patent No.: US 9,633,499 B2
(45) Date of Patent: Apr. 25, 2017

(54) SYSTEM AND METHOD FOR DETECTING PRESENCE OF ONE OR MORE USER IDENTIFICATION DEVICE

(75) Inventors: Aaron P. Creguer, Otter Lake, MI (US); David T. Proefke, Troy, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 798 days.

(21) Appl. No.: 13/570,395

(22) Filed: Aug. 9, 2012

(65) Prior Publication Data
US 2013/0043976 A1 Feb. 21, 2013

Related U.S. Application Data

(60) Provisional application No. 61/524,583, filed on Aug. 17, 2011.

(51) Int. Cl.
G08B 21/00 (2006.01)
G07C 9/00 (2006.01)
B60R 25/24 (2013.01)

(52) U.S. Cl.
CPC .......... G07C 9/00309 (2013.01); B60R 25/24 (2013.01)

(58) Field of Classification Search
CPC ............ G07C 9/00309; G07C 2209/63; G07C 9/00182; B60R 25/24
USPC ..... 340/5.2, 5.61, 5.64, 5.65, 5.72; 341/176; 701/36
See application file for complete search history.

(56) References Cited

U.S. PATENT DOCUMENTS

| 5,635,923 | A  | * | 6/1997  | Steele et al. ............... 340/905 |
| 5,767,784 | A  | * | 6/1998  | Khamharn ................. 340/5.23 |
| 6,718,240 | B1 | * | 4/2004  | Suda et al. ..................... 701/36 |
| 7,850,078 | B2 |   | 12/2010 | Christenson et al. |
| 8,164,416 | B2 |   | 4/2012  | Lee et al. |
| 2006/0145836 | A1 |   | 7/2006 | Miyazaki |
| 2006/0255908 | A1 | * | 11/2006 | Gilbert et al. ............... 340/5.61 |
| 2008/0068128 | A1 | * | 3/2008  | Ghabra et al. .............. 340/5.61 |
| 2008/0208405 | A1 | * | 8/2008  | Alrabady et al. ............ 701/36 |

(Continued)

FOREIGN PATENT DOCUMENTS

CN   201567872 U   9/2010

OTHER PUBLICATIONS

Chinese Office Action for CN Application No. 201210347596.3, dated Sep. 15, 2014, pp. 1-7.

(Continued)

*Primary Examiner* — Mark Rushing
(74) *Attorney, Agent, or Firm* — Cantor Colburn LLP

(57) ABSTRACT

A method for detecting presence of one or more security token comprises a host device transmitting a wake-up message for receipt by the security token. Based on the wake-up message and a condition of the one or more security token, the security token either awakens or returns to an inactive state. The wake-up message comprises a security code that is unique to a host device and an instruction code that is configured to selectively instruct at least one of the one or more security tokens associated with the vehicle to awaken. A system for detecting presence of a user includes a host device configured for transmitting a wake-up message to be received by a security token. The wake-up message comprises a unique security code and an instruction code that is configured to instruct security tokens associated with the vehicle to awaken.

18 Claims, 2 Drawing Sheets

(56) References Cited

U.S. PATENT DOCUMENTS

2010/0039234 A1* 2/2010 Soliven et al. .............. 340/10.1
2011/0273268 A1* 11/2011 Bassali ........................ 340/5.64

OTHER PUBLICATIONS

German Office Action for DE Application No. 102012214601.6, dated Nov. 10, 2015, pp. 1-5.

* cited by examiner

SYSTEM AND METHOD FOR DETECTING PRESENCE OF ONE OR MORE USER IDENTIFICATION DEVICE

CROSS-REFERENCES TO RELATED APPLICATIONS

This patent application claims priority to U.S. Provisional Patent Application Ser. No. 61/524,583 filed Aug. 17, 2011, which is incorporated herein by reference in its entirety.

FIELD OF THE INVENTION

The subject invention relates systems and methods for detecting presence of a user identification device and more particularly to systems and methods for selectively activating or deactivating an individual user identification device.

BACKGROUND

In today's world, vehicles, computers, and other access-controlled devices are increasingly making use of radio transmitting security tokens, such as key fobs, smart phones, and other user identification devices, to detect the presence of an authorized user. For example, when a user of a security enabled device requests access to the device, the secured device looks for the presence of a security token. To facilitate an authentication process, the secured device may send a radio signal requesting that the security token transmit an authentication key, which the secured device can use to verify whether the user (i.e., operator) seeking access is entitled to the requested access.

More recently, it has been recognized that it would be advantageous for devices to detect when an authorized user is approaching. This ability to detect an approaching user can be useful for activating one or more welcoming features such as lighting or the playing of an audible greeting. To facilitate the detection of an approaching security token, a security enabled device (i.e., a host device) may periodically transmit a wake-up signal configured to be received by a security token (e.g., a key fob or a smart phone). Upon receipt of a wake-up message from the host device, the security token transmits a response configured to be received by the host device. Upon hearing the response from the security token, the host device may conclude that the security token is approaching and initiate welcoming features.

To improve the detection of an approaching security token, the host device may decrease the period of time between wake-up transmissions. For example, one contemplated system sends four wake-up messages per second or one wake-up message every 250 ms. Since the host device may be equipped with a large rechargeable source of power, the repeated transmissions do not typically cause that power supply to become depleted. Security tokens such as key fobs and smart phones, however, typically have a much more limited supply of stored power. Therefore, where a security token is situated so as to receive a large number of wake-up messages and transmit a correspondingly large number of responses, such as where the security token has been left in close proximity to the host device for an extended period of time, the power supply in the security token may become depleted in an unreasonably short period of time, leading to failure of the approach detection features and dissatisfaction of the operator.

Thus, in addition to the ability to detect an approaching security token, it is also important for the vehicle to be able to distinguish a newly approaching security token from a security token that may have remained in or near the vehicle for some period of time. This ability to distinguish a new approach from a recurring presence can be important not only so that the welcome functions are not activated at inappropriate times, but also to prevent overconsumption of battery life in the security token.

Accordingly, it is desirable to provide a system and method for detecting the presence of a user identification device, wherein an approach detection function may be selectively and independently disabled, enabled and/or personalized for each individual UID assigned to the vehicle.

SUMMARY OF THE INVENTION

In one exemplary embodiment of the invention, a method for detecting presence of one or more security token comprises a host device transmitting a wake-up message configured for receipt by the one or more security token. The security token receives the message from the host device. Based on the wake-up message and a condition of the one or more security token, the security token either awakens or returns to an inactive state. The wake-up message comprises a security code that is unique to a host device and an instruction code that is configured to selectively instruct at least one of the one or more security tokens associated with the vehicle to awaken.

In another exemplary embodiment of the invention, a system for detecting presence of a user comprises a host device configured for transmitting a wake-up message, the wake-up message being configured to be received by a security token. A security token is configured for receiving the message from the host device and either waking up or returning to an inactive state, based on the wake-up message and a condition of the security token. The wake-up message comprises a security code that is unique to a host device and an instruction code that is configured to selectively instruct one or more individual security tokens associated with the vehicle to awaken.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
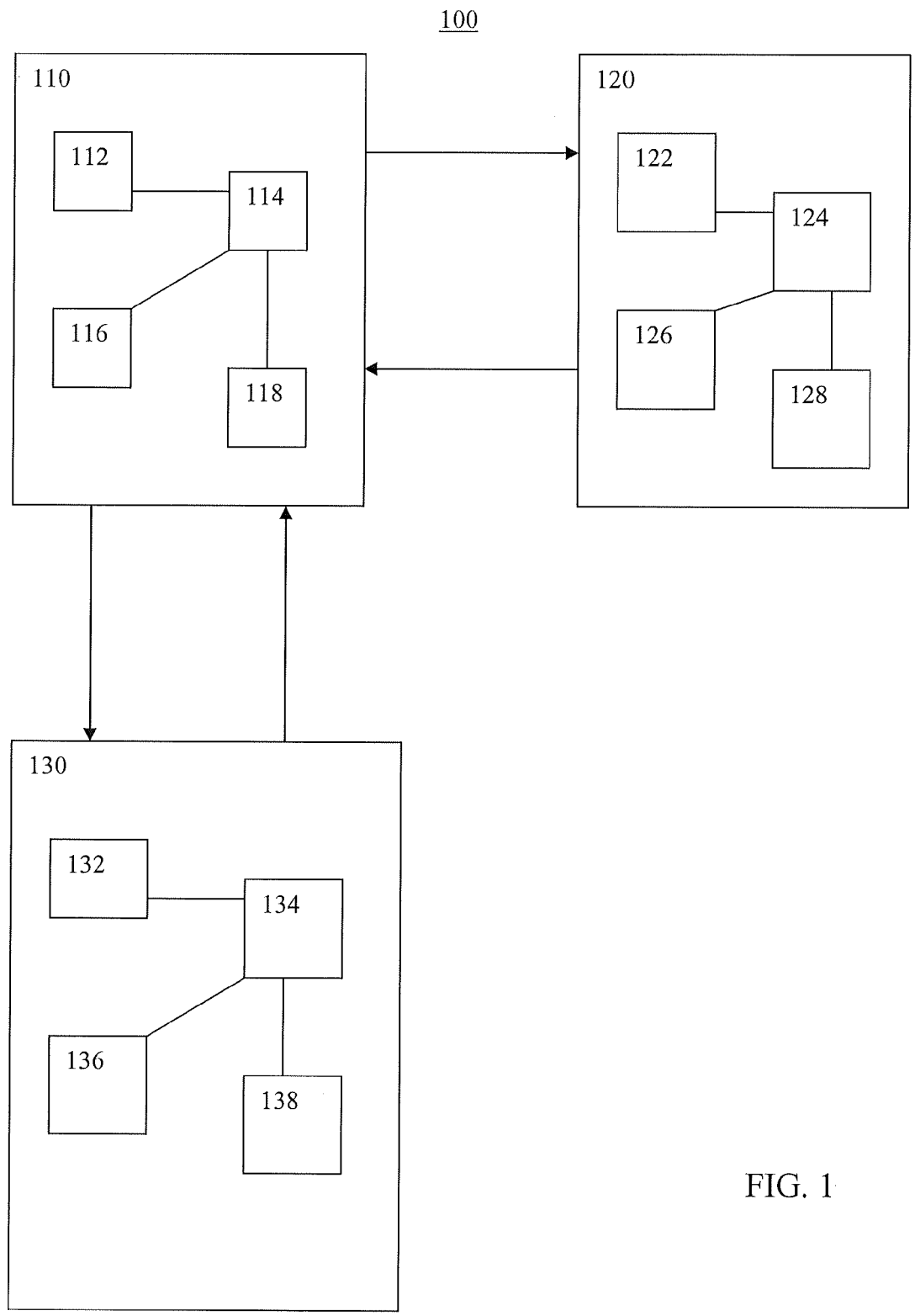
FIG. 1 is a schematic drawing of an exemplary system for detecting presence of one or more user.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the invention, as shown in FIG. 1, a system 100 for detecting an approaching security token includes a host device 110 and one or more security tokens 120, 130. The host device 110 includes a transmitter 112 configured for transmitting a wake-up message for receipt by the one or more security tokens 120, 130. The host device 110 also includes a processor 114, and memory storage device 116 coupled to the processor, and a receiver 118 configured for receiving transmissions from the one or more security tokens 120, 130.

In an exemplary embodiment, each of the one or more security tokens 120, 130 is configured for receiving the wake-up message from the host device 110 and determining whether to awaken—such as by activating its processor 124, 134 or, alternatively, returning to an inactive state. Each security token 120, 130 includes a transmitter 122, 132 configured for transmitting an identification message for receipt by the host device 110. Each security token 120, 130 also includes a memory storage device 126, 136 coupled to its respective processor 124, 134 and a receiver 128, 138 configured for receiving transmissions from the host device 110. In an exemplary embodiment, an identification message comprises a security code that is unique to the security token 120, 130 and an instruction code that is configured to instruct the host device 110 regarding one or more requested actions to be undertaken or facilitated by the host device 110.

In an exemplary embodiment, each processor 124, 134 of the one or more security tokens is configured to remain in an inactive state until awakened in accordance with a pre-defined protocol. An exemplary protocol is responsive to receipt of a wake-up transmission and may also be dependent upon one or more additional criteria or conditions such as an operator-initiated instruction to deactivate or reactivate a particular security token or to actively initiate another action by the host device 110 such as unlocking the doors of a vehicle. Each individual security token 120, 130 (e.g., each processor 124, 134) is configured to recognize messages from the host device and to recognize whether a wake-up transmission received from the host device 110 is requesting that the particular security token 120, 130 awaken or remain inactive. Each security token 120, 130 is also configured to transmit an in-range message for receipt by the host device 110.

In an exemplary embodiment, the host device 110 is a vehicle, and the one or more security tokens 120, 130 are key fobs and/or smart phones configured for operating in connection with the vehicle. In an exemplary embodiment, the security code comprises a 32 bit string that is unique to a particular host device 110 and is learned by each security token 120, 130 as part of a setup process. The instructional code comprises a 16 bit string, of which 14 bits are unique to the host device 110 and are a formative of the security code. In an exemplary embodiment, the remaining 2 bits are configured so as to instruct each particular security token whether to activate or to remain inactive. In an exemplary embodiment, a 14 bit instruction code is a derivative of the 32 bit security code string, comprising bits 9-23 (or another subset or formative) of the security code.

In an exemplary embodiment, the host device 110 is configured to decide whether to instruct a particular security token to activate or to remain inactive based on one or more predetermined criteria. For example, the host device 110 may decide to instruct a first security token 120 to remain inactive whenever the host device 110 has detected the presence of that security token 120 for a predetermined period of time. Thus, the host device is configured to receive transmissions from the security tokens and to track the occurrence and frequency of such received transmissions. In addition, a host device 110 may decide to instruct a first security token 120 to remain inactive whenever the host device 110 has received instructions from an authorized user to so instruct the security token. Accordingly, the instructional code may be configured based on a method comprising selectively disabling one or more security tokens. The instructional code may be configured to instruct at least one security token (i.e., a receiving security token, a token that is active and within receiving range) to activate or to instruct at least two security tokens to activate or to selectively instruct which particular one of the at least one security tokens to activate.

Figure 2:
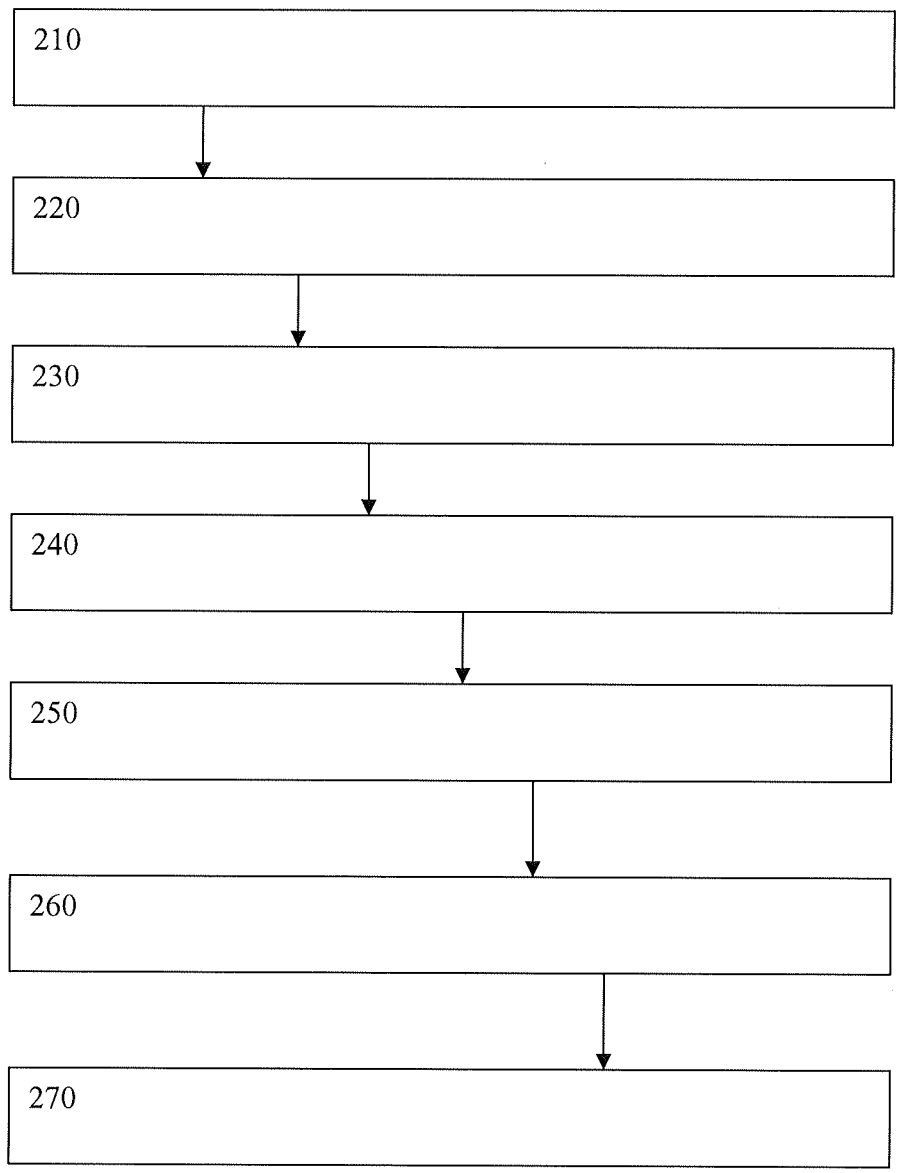
FIG. 2 is a flow diagram depicting an exemplary method for detecting presence of one or more user identification device.

As shown in FIG. 2, a method 200 for detecting the presence of a user identification device comprises transmitting (step 210) a wake-up message configured for receipt by a security token. The method also comprises receiving (step 220) the message from the host device, and, based on the wake-up message and a condition of the security token, either awakening (step 230) or performing another function (step 240). In an exemplary embodiment, awakening (step 230) is performed based on the wake-up message and a condition of the security token.

In an exemplary embodiment, the method further comprises returning to an inactive state (step 250) based on the wake-up message and a condition of the security token. For example, the condition may be that the security token has been deactivated by a user (step 260). When a particular security token approaches the host device and receives and understands a wake-up transmission from the host device and therefore awakens and transmits a responsive message that includes appropriate identity and authentication and instruction information, the host device may deem that approach of the security token has been detected and execute one of more welcoming actions (step 270) such as activating lighting.

The step of transmitting a wake-up message may further comprise instructing a specific security token to activate. In an exemplary embodiment the host device detects the persistent presence of a security token and configures a wake-up message according to a predetermined protocol. Thus, the host device may configure the instructional code based on a method comprising selectively disabling one or more security tokens. In addition, the host device may configure the instructional code so as to instruct at least one security token to activate or so as to instruct at least two security tokens to activate or so as to selectively instruct at least one security token to activate.

In an exemplary embodiment, the security token has a plurality of wake-up patterns stored for comparison to transmissions received on its low frequency (e.g., 125 khz) wake-up channel. The security token is configured so that unless and until it receives one of these pre-defined wake-up patterns, the security token will remain in an inactive state (i.e., its microprocessor and transmitter will remain dormant so as to preserve battery life). The security token is also configured, however, to awaken whenever it receives and recognizes a conforming wake-up transmission. Upon recognizing such a wake-up transmission, the security token executes a predefined awakening process configured to facilitate the host device's desired functioning in accordance with its security protocol. That process includes activating its microprocessor, performing memory checks, and issuing one or more transmission configured for receipt by the host device and containing authentication and identification information.

In an exemplary embodiment, a first wake-up transmission is configured for signaling all security tokens associated with the host device to awaken. This first wake-up transmission is appropriate for use when it is desirable to awaken all security tokens such as for normal passive functions like activation of a start button or a door handle button. Upon receipt and recognition of this first wake-up transmission, if there are two security tokens, both will awaken. An exemplary first wake-up transmission comprises 32 bits such as "yyyyyyyyyyyyyyyyyyyyyyyyyyyyyyyy".

A second type of wake-up transmissions are configured for selectively awakening individual security tokens. In accordance with this second set of wake-up transmissions, patterns 2 through n (where n is a maximum number of allowed patterns) are configured and assigned so as to independently awaken only the selected security token or tokens using predefined bit packets configured to be addressed to one or more security tokens. In an embodiment comprising two security tokens, an exemplary wake-up transmission for awakening both security tokens comprises 16 bits such as "xxxxxxxxxxxxxx11." In an exemplary embodiment, this transmission requests that both security tokens awaken. This transmission is appropriate for approach detection, and both security tokens will waken upon receipt of such a message. Another example of this second type of wake-up transmission may appear as "xxxxxxxxxxxxxx01." This approach detection wake-up transmission indicates only one of the security tokens (i.e., the security toke associated with the last bit in the string) should awaken. Upon receiving and recognizing such a transmission, only the security token associated with the indicated bit will awaken. The other security token will remain inactive.

Another example of this second type of wake-up transmission may appear as "xxxxxxxxxxxxxx10." This approach detection wake-up transmission indicates only one of the security tokens (i.e., the security toke associated with the second to last bit in the string) should awaken. Upon receiving and recognizing such a transmission, only the security token associated with the indicated bit will awaken. The other security token will remain inactive. Using the above patterns a secured host device, such as a vehicle, can poll for both of the security tokens, only one selected security token, or no security token at all, while still being able to authenticate any one of the security tokens for a passive event, such as the switching of a door handle or pressing of a start button.

Accordingly, the system and method facilitates active protocols such as approach detection while selectively enabling or disabling approach detection for selected individual security tokens. This enabling and disabling of individual security tokens can be done independently such that the enablement or disablement of one security token may be done independently of the enablement or disablement of any other security token.

In one embodiment, the selection of whether and when or how to selectively enable or disable a specific security token may be selected based on user intervention via a personalization menu such as provided on an interface associated with the host device (e.g., a radio in a vehicle). Alternatively, the host device may be configured to choose which wake-up transmission to use based on preselected criteria like the repeated presence of a particular security token in or near the host device. Such pre-selected criteria may be useful for avoiding repetitively awakening a security token that may simply have been left in a vehicle.

As a result, in an exemplary embodiment, approach detection can be selected on or off for each user ID. For example, a first user could use the approach detection feature, while a second user could, in turn, de-activate the feature according to their individualized preferences. In an exemplary embodiment, a system and method facilitates selectively disabling specific security tokens so as to avoid unnecessary repetitive activation of a security token for functions such as approach detection. This enables significant reduction in battery consumption both on the host device and in the security token in the event that a security token is left in range for extended period of time.

In an exemplary embodiment, a system and method facilitates selectively disabling an individual security token based on predefined criteria (e.g., the security token is been left within range of the wake-up transmissions for a predefined period of time) while still enabling recognition of another security token if and when that other security token approaches from out of range. In an exemplary embodiment, a system and method facilitates providing additional buffering ability against unwanted activations (e.g., where a security token repetitively enters and exits into the range within which a wake-up transmission can be received by the security token). For example, where a user repetitively approaches and departs the vicinity of the host device (e.g., a vehicle operator mowing the lawn back and forth past a parked vehicle), the system and method enables approach detection to be disabled for that security token, thereby preventing repetitive activation of welcoming features.

In an exemplary embodiment, a system and method facilitates providing for a vehicle to re-enable a previously disabled the security token in the event the vehicle was accessed when disabled the security token was not present. In an exemplary embodiment, a system and method facilitates providing added personalization of approach features. In an exemplary embodiment, a system and method facilitates provided improved battery life. In an exemplary embodiment, a system and method facilitates detection of a security token that is approaching the vehicle while selectively deactivating a security token that has been left in the vehicle.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A method for detecting a presence of one or more security token, the method comprising:
   transmitting, by a host device, a wake-up message configured for receipt by the one or more security token,
   receiving, by one or more receiving security token of the one or more security token, the wake-up message from the host device when the one or more receiving security token are located within a receiving range of the host device,
   based on the wake-up message and a condition of the one or more receiving security token, each of the one or more receiving security token either awakening and transmitting an identification message to the host device or returning to an inactive state, wherein the wake-up message comprises an instructional code and the identification message includes a security code that is unique to a first security token and an instruction code that is configured to selectively instruct the host device regarding a requested action; and the host device detecting the presence of the first security token based on the identification message.

2. The method of claim 1, further comprising each of the one or more receiving security token waking up based on the instructions code of the wake-up message and the condition of the respective receiving security token.

3. The method of claim 1, further comprising one of the one or more receiving security token returning to an inactive state based on the wake-up message and the condition of the one of the one or more receiving security token.

4. The method of claim 3, wherein the condition is that the one of the one or more receiving security token has been deactivated by a user.

5. The method of claim 1, wherein the host device is a vehicle.

6. The method of claim 1, wherein one or more of the one or more receiving security token is a key fob.

7. The method of claim 1, wherein one or more of the one or more receiving security token is a smart phone.

8. The method of claim 1, wherein the security code comprises a 32 bit string.

9. The method of claim 1, wherein the instructional code of the wake-up message comprises a 16 bit string.

10. The method of claim 9, wherein the instructional code comprises 14 bits that are unique to the host device.

11. The method of claim 1, wherein the instructional code is configured to instruct a specific one of the one or more security token to activate.

12. The method of claim 1, further comprising the host device configuring the instructional code based on detecting a persistent presence of one of the one or more receiving security token.

13. The method of claim 12, further comprising the host device configuring the instructional code to selectively disable the one of the one or more receiving security token.

14. The method of claim 1, further comprising the host device configuring the instructional code to instruct one of the one or more receiving security token to activate.

15. The method of claim 1, wherein the instructional code is configured to instruct at least two of the one or more security token to activate.

16. The method of claim 1, wherein the instructional code comprises 2 bits configured to instruct at least one of the one or more security token to activate.

17. The method of claim 1, wherein the instructional code is configured with a pattern specifying one or more of the one or more security token to selectively instruct the one or more of the one or more security token to activate.

18. A system for detecting presence of a user comprising:
a host device configured to transmit a wake-up message, the wake-up message being configured to be received by one or more security tokens within a receiving range of the host device, and detect the presence of one or more of the one or more security tokens based on an identification message from the one or more of the one or more security tokens,
the one or more security tokens configured to receive the wake-up message from the host device when located within the receiving range and configured to compare a pattern in the wake-up message with stored patterns to determine whether to wake up or return to an inactive state, based on the wake-up message and a condition of the respective one or more security tokens, and transmit the identification message based on determining to wake up,
wherein the wake-up message comprises a security code that is unique to the host device and an instructional code that is configured to selectively instruct the one or more security tokens associated with the host device to awaken.

* * * * *